Jan. 12, 1954   R. W. ALLEN   2,665,902
DRAUGHT BAR
Original Filed June 25, 1942

INVENTOR.
Raymond W. Allen
BY
ATTORNEYS

Patented Jan. 12, 1954

2,665,902

UNITED STATES PATENT OFFICE 2,665,902

DRAUGHT BAR

Raymond W. Allen, Akron, Ohio, assignor to The Firestone Tire & Rubber Company, Akron, Ohio, a corporation of Ohio Application June 20, 1946, Serial No. 678,106, now Patent No. 2,476,825, dated July 19, 1948, which is a division of application Serial No. 448,472, June 25, 1942, now Patent No. 2,415,024, dated January 28, 1947. Divided and this application December 14, 1948, Serial No. 65,101

2 Claims. (Cl. 267—69)

This application is a division of application No. 678,106, filed June 20, 1946, now Patent No. 2,476,825, dated July 19, 1948, which is a division of application No. 448,472, filed June 25, 1942, now Patent No. 2,415,024, dated January 28, 1947.

This invention relates to improvements in draught bars and more particularly for draught bars for gun carriages.

An object of the invention is to provide an improved draught bar adapted to absorb shock.

Figure 1:
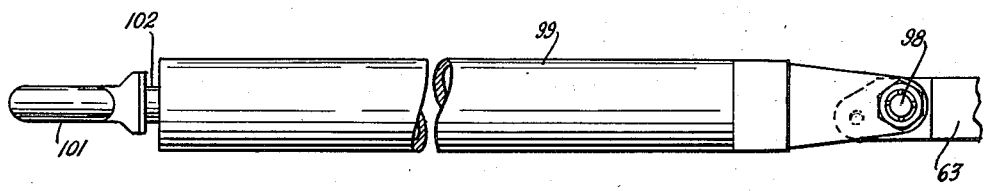
Figure 1 is a side elevation of a draught bar embodying the present invention.
Figure 2:
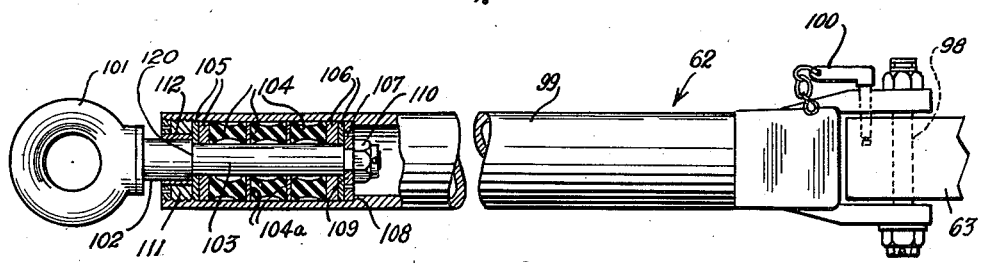
Figure 2 is a plan view of the draught bar connector with the lunette mechanism shown in longitudinal section.

Referring to the drawing in detail it will be seen that the inner end of a draught bar 62 is provided with means for pivotal connection to a gun carriage or other vehicles through the medium of a clevis link 63 attached to the carriage or vehicle not shown. The draught bar comprises a tubular shell or connector 99 having one end portion forked to embrace the clevis link 63 and apertured to receive the pivot pin 98. A locking pin 100 is insertable through the forked portion of the connector and engages in a recess in the clevis link 63. The other end of the draught connector is provided with a lunette 101 for attachment to a limber by a pintle hook. Lunette 101 has an integral shank portion comprising a cylindrical portion 102 and a reduced cylindrical portion 103 extending axially therefrom. As shown in the drawing, there is formed at the reduced cylindrical portion a shoulder 120. Portion 102 is suitably journaled within tubular shell 99. The lunette shank is substantially less in diameter than the inside diameter of the connector walls whereby to provide an annular chamber therebetween in which are disposed a plurality of rubber collars 104 between washers 105 abutting the shoulder 120 of shank portion 102 and washers 106 at the terminal end of the shank. A centrally apertured stop member 107 is positioned within the connector adjacent an annular shoulder 108 in the shell, said stop member having a central aperture of sufficient size to allow washer 109, clamped to the end of reduced shaft portion 103 by nut 110, to pass therethrough, while preventing washers 106 from so doing. The rubber collars 104 have outer and inner surfaces concave in axial cross section to provide space between the shank and the inner shell wall to enable rubber to flow upon axial compression of collars 104. Members 104 are separated by washers 104a. Double acting shock absorption is obtained between the lunette and the connector in the following manner to eliminate vibrations between the draught means and the carriage.

Compression forces between the members resulting in axial movement of the lunette toward the shell 99 cause compression of the rubber collars 104 by reason of washers 105, backed against the shoulder 120 of cylindrical portion 102, being forced inwardly of the shell to compress said collars. Forces tending to withdraw the lunette from the shell cause washers 106, backed against retention washers 109, to move axially outward of shell 99 to compress collars 104, washers 105 being restrained against outward movement by a threaded plug 111 which forms a closure for the outer shell end and provides support for a bushing 112 in which the shank portion 102 is journaled. Since rubber flows readily but will not compress, it is evident that resistance to relative movement between the shell and lunette shank is limited to the amount of axial movement therebetween required to cause distortion of the collars 104 sufficient to completely eliminate said concave portions of the rubber collars and to fill the space between the shank, shell and the slidable rigid washers 105 and 106. The present connector device provides substantial initial movement between the lunette and shell, with a sharply progressive increase in resistance to relative movement therebetween as the rubber is forced radially to fill the chamber space.

What is claimed is:

1. A rubber spring of the character described comprising a connector with a tubular bore in the outer end thereof, a lunette having a shaft with a cylindrical shank portion in journalled relation to the outer end of said connector and a reduced cylindrical portion concentrically disposed within the bore in spaced relation to the walls thereof, a series of collars of rubber-like material encircling said cylindrical portion in longitudinal slidable relation with said cylindrical portion and with the walls of said bore, said collars having radially inner and outer marginal portions engaging said cylindrical portion and connector, the radially inner and outer portions of the said collars being concave in cross section to permit rubber flow upon axial compression of the collars, a shoulder on said shaft adjacent said lunette, a rigid washer slidably mounted on said shaft intermediate said collars and said shoulder, said washer abutting said shoulder when said shank moves inwardly of the bore, a stop member disposed at the end of said bore away from said lunette, a rigid washer slidably mounted on said shaft intermediate said stop member and said collars, said last-mentioned washer abutting said stop member when said shank moves inwardly of said bore, whereby relative movement between the concentrically disposed portion of said shank and housing causes said collars to be axially compressed and the rubber to be progressively distorted into the concave portions thereof to be radially expanded into frictional contact with the surface of said bore and shank.

2. A rubber spring of the character described comprising an elongated rigid housing with a cylindrical bore therein, a lunette having a shaft mounted in said bore in spaced and axially slidable relation to the sides of said cylindrical bore, a series of rubber collars encircling said shaft and having radially inner and outer marginal portions engaging said shaft and the side of said housing respectively, said marginal portions being concave in cross section and the concavity normally being out of engagement with said shaft and housing, said shaft and housing having means associated therewith, said means comprising a shoulder on said shaft adjacent said lunette, a rigid washer slidably mounted on said shaft intermediate said collars and said shoulder, said washer abutting said shoulder when said shaft moves inwardly of the bore, a stop member disposed at the end of said bore away from said lunette, a rigid washer slidably mounted on said shaft intermediate said stop member and said collars, said last-mentioned washer abutting said stop member when said shaft moves inwardly of said bore, whereby said collars are subjected to axial compressive forces in two directions thereby being distorted radially inwardly and outwardly progressively pressing the entire surface of said marginal portions against the sides of said shaft and bore respectively.

RAYMOND W. ALLEN.

References Cited in the file of this patent

UNITED STATES PATENTS

| Number | Name | Date |
|---|---|---|
| 1,819,393 | Staley | Aug. 18, 1931 |
| 1,871,390 | Reynolds | Aug. 9, 1932 |
| 1,991,684 | Ketel | Feb. 19, 1935 |

FOREIGN PATENTS

| Number | Country | Date |
|---|---|---|
| 385,912 | France | Apr. 2, 1908 |
| 762,631 | France | Jan. 22, 1934 |